(12) United States Patent
Uhlig

(10) Patent No.: US 6,314,813 B1
(45) Date of Patent: *Nov. 13, 2001

(54) METHOD AND APPARATUS FOR MEASURING VIBRATION DAMPING

(75) Inventor: Robert P Uhlig, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/519,485

(22) Filed: Mar. 6, 2000

(51) Int. Cl.⁷ ....................................... G01M 7/00
(52) U.S. Cl. .................. 73/664; 73/11.05; 73/662; 73/579
(58) Field of Search ................ 73/570, 579, 662, 73/664, 11.05, 660, 671, 657, 573, 574, 584, 866.5

(56) References Cited

U.S. PATENT DOCUMENTS

| | | | |
|---|---|---|---|
| 2,618,968 | 11/1952 | McConnell | 73/67 |
| 2,758,706 | 8/1956 | Quinlan | 203/75 |
| 3,228,233 | 1/1966 | Keldenich | 73/67 |
| 3,417,610 | 12/1968 | Nance et al. | 73/67 |
| 3,675,471 * | 7/1972 | Bouche | 73/574 |
| 4,211,105 | 7/1980 | Szabo et al. | 73/11 |
| 4,502,329 | 3/1985 | Fukunaga et al. | 73/573 |
| 4,513,622 | 4/1985 | Uretsky | 73/664 |
| 4,543,827 | 10/1985 | Tominaga et al. | 73/602 |
| 4,545,249 | 10/1985 | Matay | 73/597 |
| 4,817,431 | 4/1989 | Schlawne | 73/600 |
| 4,979,952 | 12/1990 | Kubota et al. | 318/169 |
| 5,086,564 | 2/1992 | Schalz | 248/638 |
| 5,113,697 | 5/1992 | Schlawne | 73/602 |
| 5,275,052 | 1/1994 | Luttrell | 73/619 |
| 5,520,052 * | 5/1996 | Pechersky | 73/579 |
| 6,014,899 * | 1/2000 | Uhlig et al. | 73/664 |
| 6,123,350 * | 9/2000 | Suzuki | 280/124 |
| 6,145,382 * | 11/2000 | Nagasawa et al. | 73/664 |

* cited by examiner

Primary Examiner—Daniel S. Larkin
Assistant Examiner—Jacques Saint-Surin
(74) Attorney, Agent, or Firm—Mark P. Calcaterra

(57) ABSTRACT

The vibration damping properties of brake rotors and drums can be represented accurately and repeatably by a single factor obtained from a curve fitting based on an eighth order sine function. A series of test points taken only around one or more vibrational antinodes is used to measure resonant frequencies and vibration decay times around the periphery of a part. This data is then used to determine Q-factors, which are found to vary sinusoidally around an annular brake part.

11 Claims, 7 Drawing Sheets

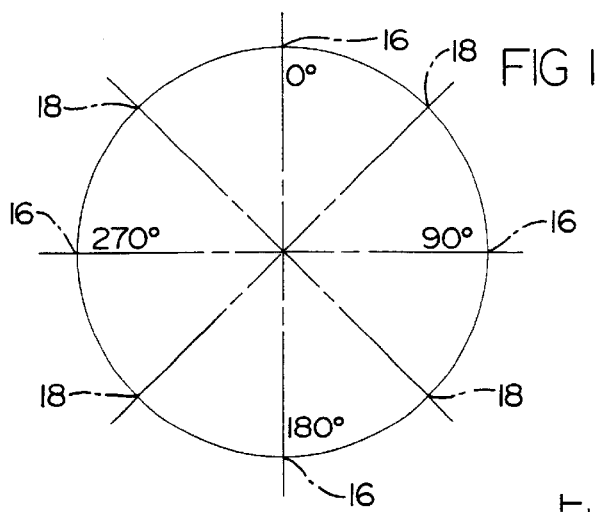
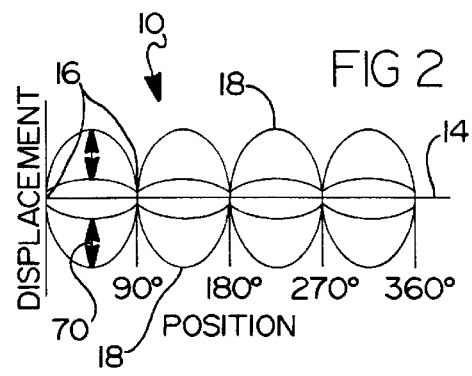
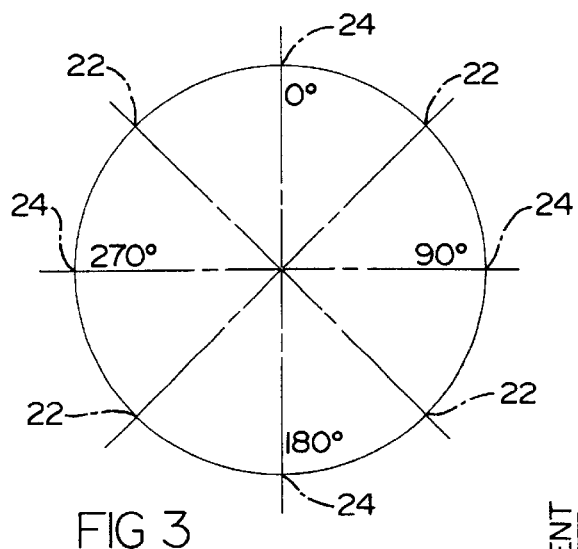
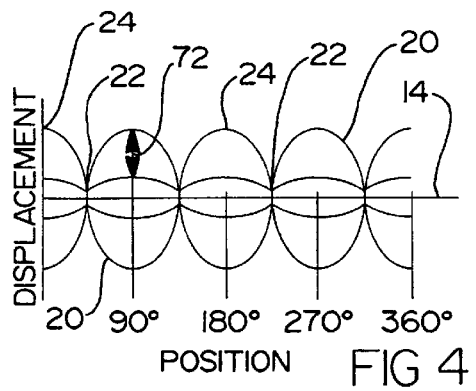

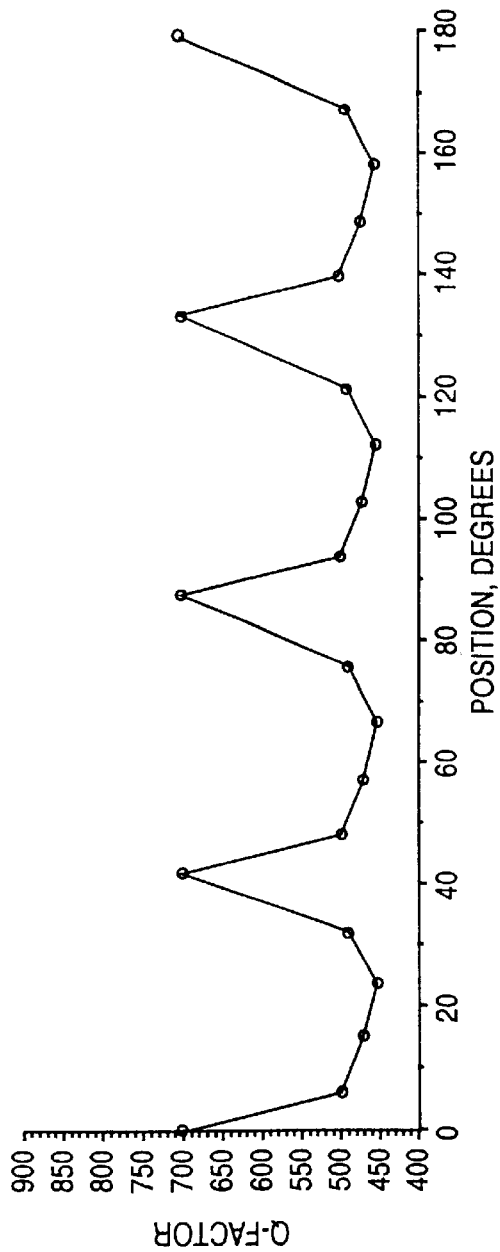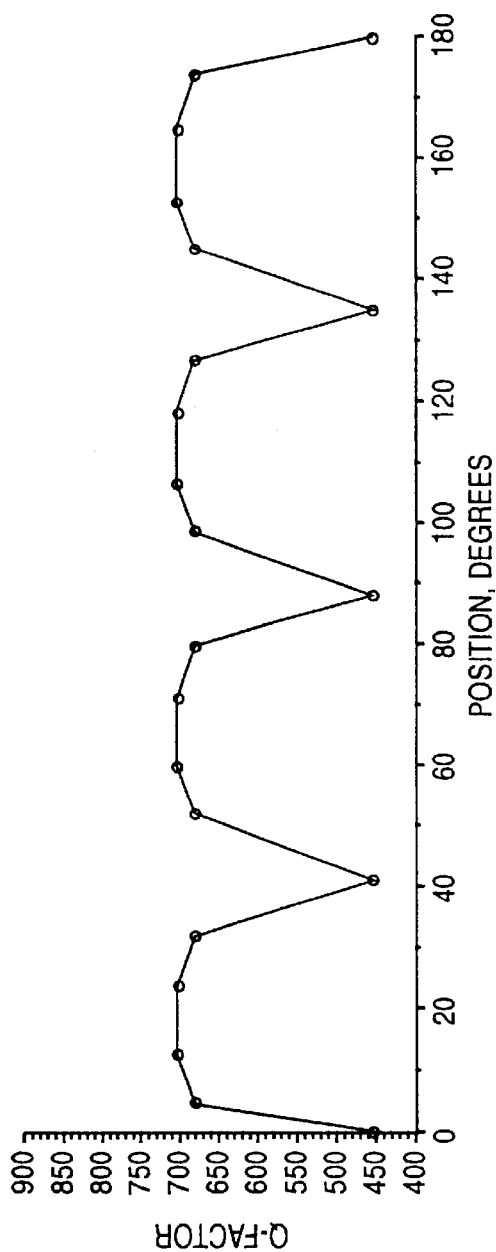

METHOD AND APPARATUS FOR MEASURING VIBRATION DAMPING

BACKGROUND OF THE INVENTION

1. Field of The Invention

The present invention relates in general to measuring a part, such as a brake rotor, to determine its ability to damp vibrations, and particularly relates to a method for locating vibration antinodes on such parts and calculating vibration parameters around the antinodes. The invention is an improvement of the method described in U.S. Pat. No. 6,014,899.

2. Description of Prior Developments

Although the method of determining and quantifying vibration and noise suppression as described in U.S. Pat. No. 6,014,899, is most effective, it is somewhat time consuming to complete. That is, when the method of U.S. Pat. No. 6,014,899 is carried out, measurements of the slope of the vibration decay curve of a part are taken at close intervals around the circumference of the part. Each measurement can take a significant amount of time to complete. Moreover, this prior method is subject to certain inaccuracies created by modulated, nonlinear vibration decay curves. This modulation is created by two separate modes of vibration which are present in the excited part and which can lead to significant differences in vibration damping measurements and Q-factor calculations, depending on the location on the part at which the slope of the decay curve is measured.

In the method of U.S. Pat. No. 6,014,899, it is suggested to simply eliminate those calculated values of vibration damping, known as Q-factors, which significantly exceed or differ from the average Q-factor calculated for the part. (It has now been learned that such values typically occur around vibration nodes on the part where modulated vibration decay curves are common.) Although this prior technique of simply ignoring and excluding large variations in Q-factors from the Q-factor curve fit improves the accuracy of the calculation of the average Q-factor of the part, it does not reduce the time required to calculate the average Q-factor, nor does it eliminate the need to make Q-factor calculations at each test point.

Accordingly, a need exists for a method and apparatus for reducing the time required to calculate an average or other single value representative Q-factor of a part.

A further need exists for increasing the accuracy of Q-factor measurement.

A further need exists for avoiding the use of modulated decay curves in Q-factor calculations which previously reduced the accuracy of Q-factor calculations.

Yet a further need exists for a method of determining Q-factors on a part, such that modulated nonlinear decay curves are excluded from the Q-factor calculations.

SUMMARY OF THE INVENTION

The improved method described herein has been developed to fulfill the needs noted above and therefore has as an object the provision of a method and apparatus for measuring the average Q-factor of a part in a reduced amount of time and with an increase in accuracy over prior methods. A further object is to eliminate the calculation of Q-factors which are based on modulated vibration decay curves.

These and other objects are achieved in accordance with the present invention which is directed to a method and apparatus for expediting the determination of the average or representative Q-factor of a part and for increasing the accuracy of the associated Q-factor calculation by avoiding areas on a test part likely to produce modulated vibration decay curves. The invention is based on the realization that the most accurate Q-factor calculations are determined from vibration decay slope values taken at the vibrational antinodes of the part, and that the most inaccurate Q-factor calculations are derived from vibration decay slope values taken at the vibrational nodes of the part.

Since it is now known that the value of the Q-factor varies sinusoidally around the circumference of a part, such as a circular brake rotor or brake drum, it is possible to use only a portion of such a sinusoidal curve to define the entire curve. The present invention is based on the use of only selected portions of such a sinusoidal curve to reduce the number of test points required for accurate curve fitting and to avoid testing those points on a part which are subject to modulated vibration decay curves. Instead of testing a part at closely spaced arbitrary intervals, the present invention tests a part only around one or more vibrational antinodes.

By measuring vibration decay slopes only around vibrational antinodes, fewer test points are required, and the accuracy of the test data is greatly improved. That is, the most inaccurate vibration decay slope data is typically measured around vibration nodes where the greatest sharing of vibrational energy takes place between the two "twin pair" vibration modes, as discussed in U.S. Pat. No. 6,014,899.

The twin vibration modes interact around vibrational nodes to produce non-linear modulated vibration decay curves, which are modulated by the difference between the two natural frequencies, typically a difference of about 0 to 5 Hz. This modulation is greatest at vibrational nodes and produces Q-factor values, which when plotted, can and often do define spiked portions on an otherwise sinusoidal plot. These spiked portions of the plot adversely affect the accuracy of the curve fitting and resulting overall Q-factor value obtained from the curve fit.

By locating the positions of the vibrational antinodes in advance and calculating Q-factor values only around the antinodes, the spiked portions of the sinusoidal plot of Q-factor values can be eliminated and ignored. This approach also eliminates much of the variance in Q-factor calculations due to the effects of other variables which affect decay slope measurements taken between antinode locations.

Because of part sample nonlinearity and a lack of homogeneity due to material discontinuities, the measurement of Q-factor values between vibrational antinode locations on the part sample can produce, when plotted, either maximum or minimum values. Other factors determining the production of a maximum or minimum Q-factor values include the decay range (in decibels) over which the vibration decay curve is measured, the difference in frequencies between the twin mode frequency pairs, the number of points measured on the sample part, and the modulation effects from mode pair frequency interaction during decay measurements.

The present invention takes this nonlinearity into account, and through an appropriate correlation or superposition of Q-factor curve fit with the natural frequency plot of the twin vibration modes, a consistent and accurate determination of Q-factor can be obtained.

The improved method described below determines the angular location of maximum response for each of the two frequencies of the two nodal diameter vibration modes as well as the frequencies of each. Q-factor measurements are taken only around antinodes while exciting the sample at a pre-determined frequency of the dominant one (largest response) of the two twin vibration modes at each selected antinode. A sine wave function is then fit to this abbreviated data similar to the original method of U.S. Pat. No. 6,014,899, however, the phase and amplitude information of the plot are utilized in conjunction with the zero crossing value ("$C_2$") to determine a single average or representative Q-factor at the antinodes (rather than simply at "$C_2$"). This new value is a value that is more repeatable and describes the sample characteristics better than earlier methods which used only $C_2$.

The improved method deals with the fact that each of the two twin mode frequencies can have a different Q-factor associated with it, and that the points of maximum response are not necessarily 45 degrees apart and not necessarily coincident with the Q-factor maximum or minimum. What used to take 45 minutes to an hour (using a semi-automated PC driven system to measure every point's frequency and damping) with the prior method now takes 15 to 20 minutes with the improved method, and achieves accuracy within about 1% versus 3% with the original method of U.S. Pat. No. 6,014,899.

The Q-factor can be used effectively with brake component fingerprinting to accomplish two important functions. First, the method of the invention can be used for measurement of significant physical properties at each step in the brake (or other component) design process, and to identify and flag changes in such properties which potentially could cause brake noise. Second, by gathering data on key components, one can begin to understand what deserves attention for component variation reduction with respect to vibration damping characteristics. Although the Q-factor of rotors and drums is an important new item on this fingerprinting list, it has heretofore been a difficult and time-consuming measurement to obtain.

This improvement deals with novel methodology to expedite and facilitate the measurement and increase the accuracy of Q-factor measurement while drastically cutting the time required for Q-factor measurement. The new method is well adapted to automation and can be carried out using off-the-shelf components.

The method of the present invention establishes the two resonant frequencies associated with the second nodal diameter mode, takes measurements only around antinodes, and fits the data with a sine wave. Using the amplitude and phase information in addition to the average value of the sine fit, the Q-factor is determined at the "cleanest" data points, that is, the points around the sample at which the two nodal frequencies interact the least. This eliminates troublesome sample non-linearity and discontinuity effects which might produce either Q-factor maximum or minimum values at nodal locations depending on the decibel range (delta dB's) over which the measurement is taken, the difference in frequencies of the mode pair, how many points are measured, and modulation effects from frequency interaction during vibration decay curve measurements.

BRIEF DESCRIPTION OF THE DRAWINGS

FIG. 1 is a schematic top plan view of a disc brake rotor depicting the pattern of a first vibrational bending mode shape produced by application of an external source of vibration;

FIG. 2 is a plot of the standing wave displacement of the rotor of FIG. 1 showing the sinusoidal variation in amplitude around the circumference of the rotor;

FIG. 3 is a view of the rotor of FIG. 1 depicting a second vibrational bending mode shape which co-exists with and is superimposed upon the first vibrational bending mode shape, but circumferentially displaced by 45 °;

FIG. 4 is a plot similar to FIG. 2, showing the standing wave displacement of the second vibrational bending mode shape;

FIG. 8 is a plot similar to FIG. 7A showing a Q-factor plot having upwardly spiked portions;

FIG. 9 is a plot similar to FIG. 8 showing a Q-factor plot having downwardly spiked portions;

In the various figures of the drawings, like reference characters designate like or similar parts.

DESCRIPTION OF THE PREFERRED EMBODIMENTS

Figure 5:
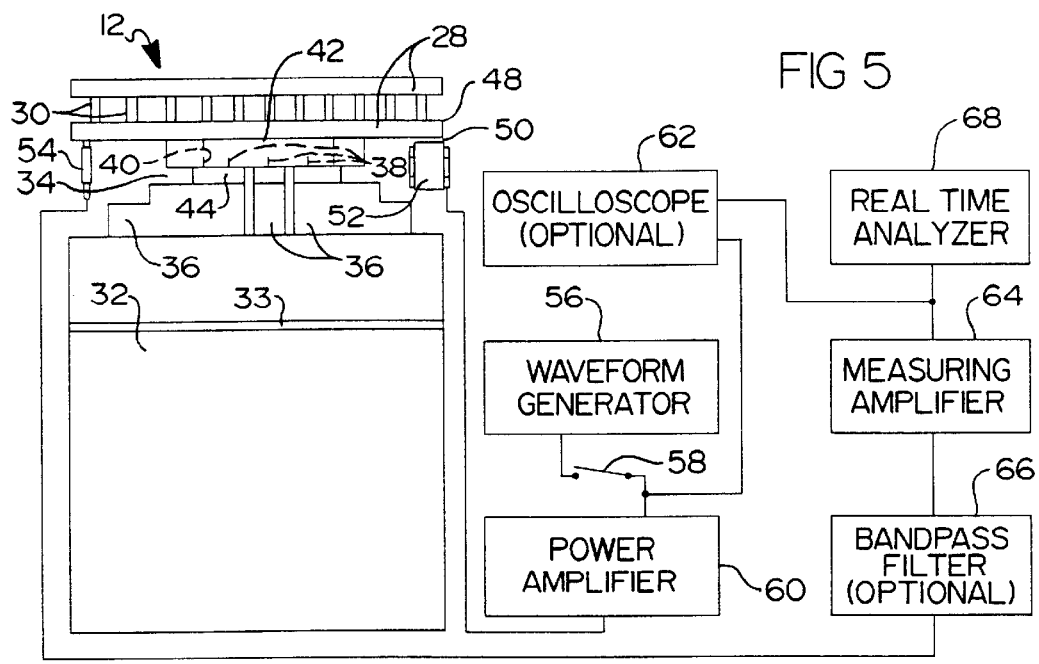
FIG. 5 is a schematic view of a test apparatus arranged in accordance with the present invention and including a block diagram of vibration signal input, output and measuring components.

In order to better appreciate the improvements of the present invention, a review of the original method disclosed in U.S. Pat. No. 6,014,899 will be of value. The original method can be understood from a review of FIGS. 1 and 2 which represent the location and magnitude of a sinusoidal vibrational standing wave 10 induced in a ferromagnetic brake rotor 12. A source of vibrational energy, such as an electromagnetic exciter coil, can be used to produce the standing wave 10 for the purpose of analyzing the vibration damping characteristics of the rotor.

Beginning at the top or 0° position of rotor 12, standing wave 10 exhibits a node 16 which represents a point of zero or minimum vibrational displacement in rotor 12. As the standing wave 10 is observed at a position displaced 45° clockwise from the top position, the standing wave experiences a sinusoidal increase in vibrational amplitude until reaching antinode 18 which represents a point of maximum vibrational displacement in rotor 12.

Continuing clockwise from antinode 18, the amplitude of standing wave 10 decreases sinusoidally over the next 45° until another node 16 is reached at 90°. This pattern repeats itself over the remaining 270° of the rotor until reaching the initial top position.

It has been discovered that a second standing wave 20 co-exists with the first standing wave 10 and influences the Q-factor of the part. The amplitude and period of the second standing wave 20 are virtually the same as those of the first standing wave, but circumferentially displaced on rotor 10 by 45°. In this manner, the nodes 22 of standing wave 20 are located at the same location on rotor 12 as the antinodes 18 on standing wave 10. Similarly, the antinodes 24 of standing wave 20 are located at the same location on rotor 12 as the nodes 16 on standing wave 10.

The presence of standing waves 10 and 20 produces a complex vibrational pattern over rotor 12 which has led to vibration damping measurements which have previously been considered anomalous or spurious. However, once it is appreciated that the vibrational energy applied to rotor 12 is shared between these twin modes of vibration, and that the degree of energy sharing depends on the relative position on rotor 12 where the external vibrational energy is applied, then a consistent reliable method of characterizing as a single parameter the degree of vibration damping inherent in rotor 12 is possible.

In order to characterize the vibrating damping capability of a part, such as rotor 12, as a single parameter such as a Q-factor, the variability of vibration damping as a function of the application point of the input vibrational energy must be considered. This has been accomplished in accordance with the present invention by measuring the Q-factor at a plurality or series of points around a part and calculating a value representative of the entire series.

The test setup of FIG. 5 has been used to provide input data for analysis of the variability of Q-factors and to provide raw data for calculating a single parameter representative of overall vibration damping performance. A test sample part such as brake rotor 12 is used to obtain such data. Rotor 12 includes circular planar side plates 28 braced by interposed radially extending vanes 30. The rotor 12 is supported on a massive base 32. The upper portion of the base can be adjustably and rotatably connected to the lower portion by a rotary coupling 33.

A centering mechanism 34 is provided on base 32 for aligning the rotor on the base in a predetermined centered position. The centering mechanism may take the form of a conventional chuck jaw assembly including three evenly spaced radially adjustable chuck jaws 36. Each chuck jaw includes a finger 38 which is engageable with a central circular bore wall 40 formed in a hub portion 42 of rotor 12.

A vibration isolating pad 44 is provided on each chuck jaw 36 for isolating vibration and energy transmission between the base and centering mechanism and the rotor. This vibration isolation improves the accuracy of the test data by minimizing the influence of external factors, i.e., boundary conditions.

The sample rotor 12 is placed on the rubber or elastomeric isolating pads 44 and the chuck jaws 36 are opened such that fingers 38 abut the central bore wall 40 and thereby center the rotor in a predetermined position. The chuck jaws are then retracted such that fingers 38 are slightly spaced from the bore wall 40 thereby leaving the rotor supported only by contact with the isolating pads.

An exciter coil 46 is then vertically positioned at a predetermined spacing from the lower side plate 28 and horizontally or radially positioned at a predetermined spacing from the outer diameter 48 of rotor 12. In the example depicted in FIG. 5, the outer edge 50 of the coil core 52 is aligned directly below the outer diameter 48 of rotor 12. The exciter coil 46 electromagnetically induces vibrations in rotor 12 without direct physical contact through the application of a pulsing electromagnetic field.

The level or amplitude of vibrations induced in rotor 12 is measured with a transducer such as microphone 54 which may include a preamplifier. The microphone is also carefully positioned adjacent the rotor at a predetermined horizontal and vertical spacing from side plate 28. In the example of FIG. 5, the transducer microphone is positioned diametrically across or 180° from the exciter coil 46.

With the exciter coil and transducer aligned with the rotor such as described above, a waveform or frequency generator 56 is set to provide a sinusoidal wave output at a constant amplitude, with a DC offset. This signal is passed through closed switch 58 to a power amplifier 60 which amplifies the output of the waveform generator and sends the amplified signal to the exciter coil 46. An oscilloscope 62 may be connected to the output of the waveform generator to monitor the waveform frequency.

As the exciter coil 46 magnetically induces vibrations in the rotor 12, the microphone 54 measures the sound or vibration level emitted by the rotor and provides a measure of this sound level to a measuring amplifier 64. A bandpass filter 66 may be used to eliminate frequencies outside the range of interest.

The output of the measuring amplifier is observed as the frequency of the waveform generator is varied. When the measuring amplifier 64 indicates that a peak or resonant frequency, fr, output signal has been received and transmitted by microphone 54, the frequency readout of the waveform generator 56 is noted. Confirmation of the resonant frequency, fr, can be obtained with optional oscilloscope 62.

With the frequency of the sine wave produced by waveform generator 56 set to produce the peak output amplitude measured by measuring amplifier 64, the gain of the audio power amplifier 60 is adjusted to produce a predetermined measured output voltage from microphone 54. More accurate data is obtained by setting the output voltage from the microphone to the same level for each test location. The real time analyzer 68 is then set to wait for triggering or opening of switch 58.

At this point, switch 58 is opened thereby interrupting the output of the waveform generator 56 and deactivating the exciter coil. This eliminates the input of vibrational energy into the rotor causing the vibrations in the rotor to decay. This decay is recorded and graphed on a decibel versus time plot by the real time analyzer 68 which receives the decaying sound level signal from the measuring amplifier 64.

The measured values of interest obtained from this procedure are the frequency of the waveform generator at triggering and the slope of the decay curve obtained from the real time analyzer 68. In particular, at triggering of switch 58, the real time analyzer 68 plots the decay of the sound level produced by the rotor as a function of time. The resonant frequency at triggering is preferably set to an accuracy of 0.01 Hz and a predetermined portion of the decay curve is measured within an accuracy of 0.001 millisecond.

Although any portion of the decay curve may be chosen for slope measurement purposes, the time for a 25 dB decay from 90 dB to 65 dB has been found suitable for purposes of carrying out the invention. Twenty-five decibels are recommended as a minimum decay span to minimize error in determining the decay rate. Linear regression or other curve fitting techniques may be used to calculate this decay time from the real time decay plot. As seen in FIGS. 2 and 4, the amplitudes of both standing waves 10, 20 decrease over the decay time by amounts 70, 72.

Figure 6:
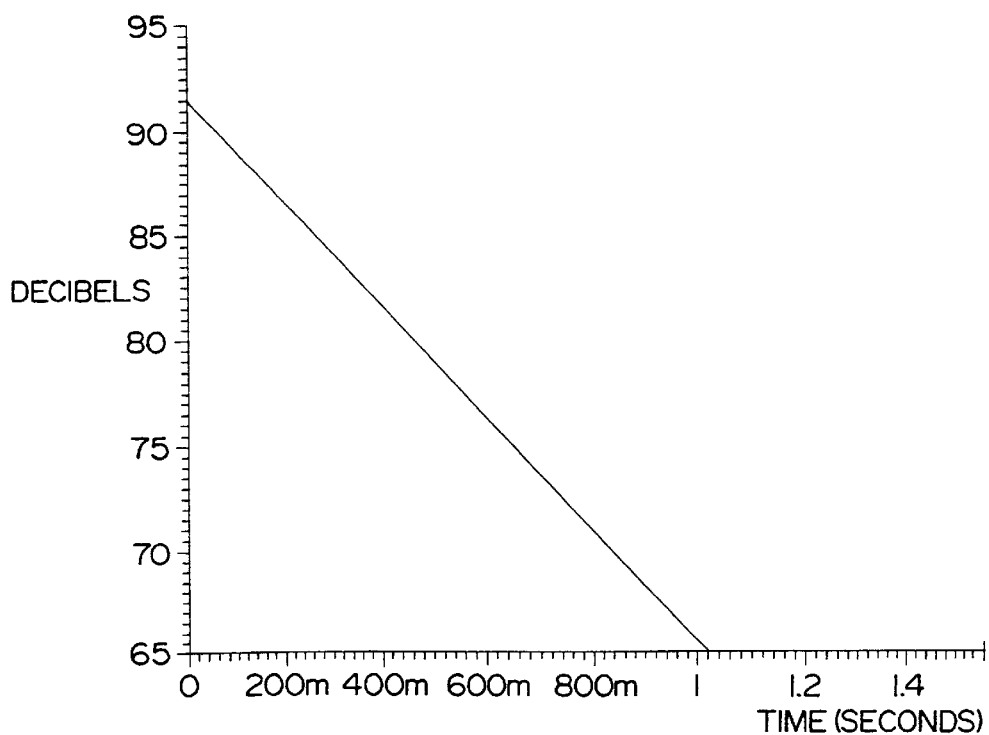
FIG. 6 is a plot of a decay curve obtained from the screen of the real time analyzer of FIG. 5.

FIG. 6 depicts a typical decay curve as recorded on the real time analyzer 68 of FIG. 5. It is the slope of this decay curve which is used to calculate the Q-factor at each test point.

While one decay plot per test location may be adequate, it has been found advantageous to obtain two, three or more decay plots for the same test location to obtain an average. This average value is then used to compute the Q value. At this point the rotor is rotated on its support through rotatable coupling 33 or other suitable means to a new test position and the above procedure is repeated.

From 20 to 50 spaced apart positions are measured around rotor 12, preferably using no larger than 10-degree increments between test points to measure the decay curves over at least 180 degrees of the test part. Although equal increments between test points are preferred, unequal increments may be used with equally accurate results. Any point on the circumference of the test part may be chosen as the first test position.

The resonant frequency, fr (in Hertz), for each test position as well as the decay time data for each test position is entered into the formula:

Q=(27.3)(fr)(decay time in seconds per 25 dB decay span).

The resulting Q values for each test position are processed using known curve fitting techniques to identify any consistent relationship between test position and Q-factor values.

It has been empirically determined that the test data best fit an eighth order sine function expressed as:

$Q=C_1 \sin 8\omega + C_2$.

Although a simple arithmetic average, median or other parameter calculated from the measured Q values may be used to characterize the damping of the test part as a single value, the most accurate and repeatable characterization of vibration damping has been found to be the value of $C_2$ in the expression $C_1 \sin 8\omega + C_2$. The value of $C_2$ represents the displacement of the midpoint of the sine function above the horizontal axis of the sine curve plot $C_1 \sin 8\omega + C_2$. The value of $C_1$ represents the amplitude of the sine function, i.e. one-half the difference between the minimum and maximum Q-factor values.

Table 1 provides data obtained using the test equipment and setup of FIG. 5. Each test point was taken in axial alignment with one of the rotor vanes 30. Although the test be measured over its entire 360° circumference or periphery, it has been found urements taken over 180° of circumference have been satisfactory to accurately the value of $C_2$. At least 90° of circumference should be tested to ensure that at least one full period of each mode is included.

TABLE 1

| No. of Rotor Vanes | 42 |
| Coil Position | 0 Inches from edge |
| Coil Spacing | 0.05 Inches |
| Mic. Position | 0.5 Inches from edge |
| Mic. Spacing | 0.05 Inches |
| Sound Level | 1.0 Volts |
| Decay Rate | 25 span, dB. |

| Position | Position ω deg. | Input Freq. Fr Hz | Decay Time Ms | Q-factor |
|---|---|---|---|---|
| 0 | 0.00 | 1051.04 | 453.125 | 520.07 |
| 1 | 8.57 | 1050.97 | 437.500 | 502.10 |
| 2 | 17.14 | 1050.93 | 414.062 | 475.18 |
| 3 | 25.71 | 1050.73 | 402.344 | 461.65 |
| 4 | 34.29 | 1050.62 | 425.781 | 488.49 |
| 5 | 42.86 | 1050.55 | 441.406 | 506.38 |
| 6 | 51.43 | 1050.53 | 441.406 | 506.37 |
| 7 | 60.00 | 1050.67 | 417.969 | 479.55 |

TABLE 1-continued

| 8 | 68.57 | 1050.71 | 398.437 | 457.16 |
| 9 | 77.14 | 1050.81 | 414.062 | 475.13 |
| 10 | 85.71 | 1050.85 | 437.500 | 502.04 |
| 11 | 94.29 | 1050.87 | 445.312 | 511.02 |
| 12 | 102.86 | 1050.81 | 421.875 | 484.10 |
| 13 | 111.43 | 1050.64 | 398.437 | 457.13 |
| 14 | 120.00 | 1050.44 | 410.156 | 470.48 |
| 15 | 128.57 | 1050.39 | 433.594 | 497.34 |
| 16 | 137.14 | 1050.35 | 441.406 | 506.28 |
| 17 | 145.71 | 1050.37 | 429.687 | 492.85 |
| 18 | 154.29 | 1050.51 | 406.250 | 466.03 |
| 19 | 162.86 | 1050.55 | 402.344 | 461.57 |
| 20 | 171.43 | 1050.66 | 425.781 | 488.51 |
| 21 | 180.00 | 1050.64 | 445.312 | 510.91 |

Figure 7A:
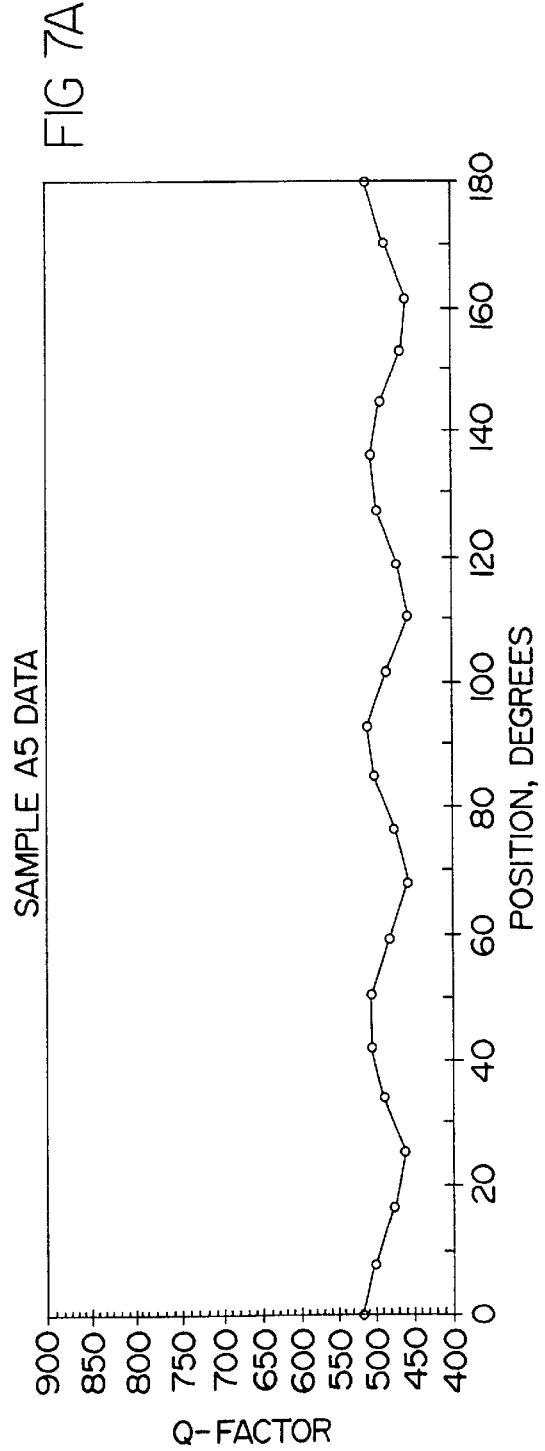
FIG. 7A is a straight line plot of Q-factors derived from the apparatus of FIG. 5 representing the data provided in Table 1.
Figure 7B:
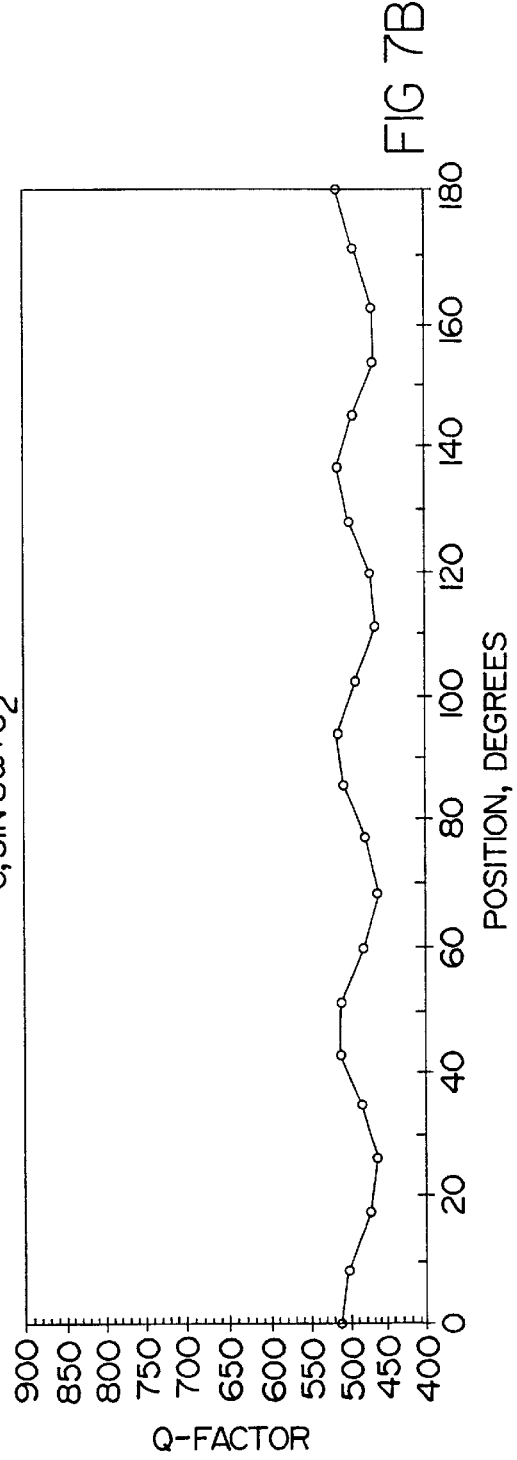
FIG. 7B is a plot of the eighth order sine function which fits the data of Table 1.

The data of Table 1 has been plotted and interconnected by straight lines in FIG. 7A and in FIG. 7B the eighth order sine function, $Q=C_1 \sin 8\omega = C_2$, which fits the same data has been plotted.

It can be seen that this data plot closely follows the eighth order sine function and is periodic over 45°. It should be noted that although the Q-factor varies sinusoidally around the circumference of the rotor, it does not follow the displacement pattern of the vibration modes depicted in FIGS. 1 through 4 which is, in fact, periodic over 90°.

The arithmetic average of the Q-factors measured in Table 1 equals 487.29 while $C_2$ calculated from commercially available best fit curve fitting software equals 486.12. However, the actual range of Q values in Table 1 extends from 457.13 to 520.07 which equals a variance of 62.94. Such a variance of over 10% in the same part clearly emphasizes the problem associated with prior measuring techniques.

By curve fitting the Q-factor data using commercially available software such as Lotus or Excel spreadsheet software, to an eighth order sine function, anomalous data points are prevented from unduly affecting the result, i.e., the value of $C_2$.

The determination of the accuracy of the sine wave fit to the data is useful to improve the accuracy of $C_2$, the Q-factor value for the sample. An average difference of less than 10 between the calculated sine wave values and the measured Q-factor values has been found to be an indication of suitable accuracy of fit. In the case where the average difference is greater than 10, recalculation of the sine wave fit after dropping the point or points which exhibit the greatest difference(s) further improves the accuracy of $C_2$.

Although the method described above as set forth in U.S. Pat. No. 6,014,899 provides satisfactory results, significant improvements have been developed which increase the accuracy and repeatability of the determination of a representative Q-factor value. This improved method can also reduce the time required to determine such a Q-factor value by at least a factor of two.

As stated above, in the original method a test part is excited at various angular positions and a Q-factor is calculated at each position. The resulting Q-factors are fitted with a sine wave function and the zero crossing point "$C_2$" of the fit function is defined as the test part's one-number Q-factor. Such a plot is represented in FIG. 7B.

While the plot of FIG. 7B is closely defined by the eighth order sine function $C_1 \sin 8\omega + C_2$, it has been found that some parts do not produce such well-defined plots. For example, as shown schematically in FIG. 8, the plot of Q-factors taken from a brake rotor test part does not closely fit an eighth order sine function insofar as non-sinusodial upwardly spiked regions are produced by certain maximum Q-factor values which distort an otherwise sinusoidal plot. Another poorly defined plot of Q-factors is shown schematically in FIG. 9 wherein downwardly spiked regions distort an otherwise sinusoidal plot of another brake rotor test part.

A study of FIGS. 8 and 9 reveals that certain rounded portions of each plot more closely fit the sine wave function of $Q=C_1 \sin 8\Psi + C_2$ than other spiked portions. By fitting a sine function to only the smoother rounder portions of each plot and eliminating test points around the spiked maximum or minimum portions of each plot, a highly accurate and expeditious determination of a representative Q-factor value for each part can be made.

More particularly, it has been found that the sinusoidal portions of each of the plots of FIGS. 8 and 9 are centered around a vibrational antinode of each respective part and that the spiked portions of each of the plots are centered around a vibrational node of each part. Thus, if a first vibrational antinode is located on a test part, only several test points closely adjacent to the antinode need be tested. Areas between the antinodes need not and preferably should not be tested as these areas are subject to nonlinear or modulated decay curves. Moreover, since antinodes occur every 45° around a circular vibrating part such as a brake drum or rotor, the locations of additional vibrational antinodes can be relatively easily located and additional test points can be tested adjacent to these additional antinodes.

Figure 10:
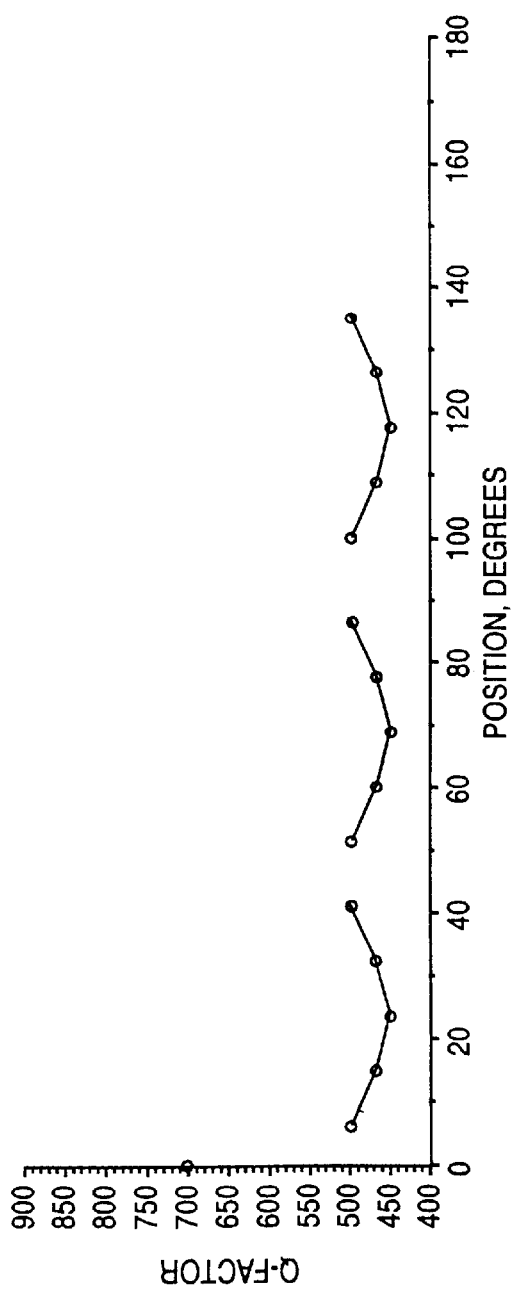
FIG. 10 is a plot of Q-factors measured only around the vibration antinodes of a test part.

As seen schematically in FIG. 10, only a few test points of the plot of FIG. 8 are required around several antinodes in order to define the entire eighth order sine function plot. The areas of the plot of FIG. 10 shown in dashed lines need not and should not be tested. These test points between the antinodes in the dashed line region are prone to inaccuracies in Q-factor measurement. The inaccuracies can be attributed to the presence of modulated vibration decay curves at points between vibrational antinodes.

Figure 11:
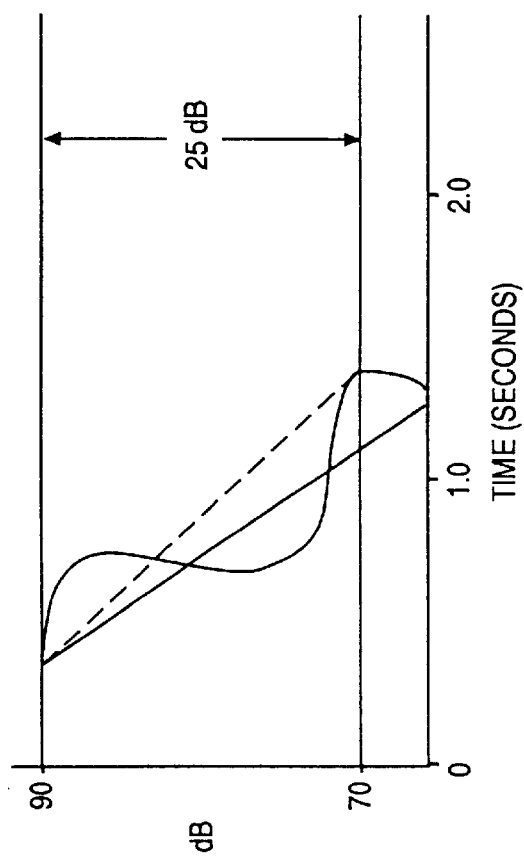
FIG. 11 is a plot of decay curves having linear and nonlinear (or modulated) decay slopes.

For example, as seen in FIG. 11, an ideal linear decay curve of the type shown in FIG. 6 is shown along with a superimposed modulated decay curve. The slope of the linear decay curve is substantially constant over its range of decay and will provide the same value to a Q-factor calculation, regardless of the dB range over which the slope measurement is taken. As mentioned above, this slope value is a required input for each Q-factor calculation.

In contrast, the slope of the modulated decay curve varies greatly and can provide significantly different values to a Q-factor calculation taken at the same test point, depending on the starting and ending points selected on the undulating curve, and depending on the dB range over which the slope is measured. It can be readily seen that the slopes of the linear and modulated decay curves are different over the same dB decay range. The slope of the modulated decay curve is shown in dashed lines over a 25 dB decay range and is clearly different from the slope of the linear decay curve. By avoiding data taken from such modulated decay curves, a more accurate and consistent characterization of the Q-factor of the part can be obtained.

Figure 12:
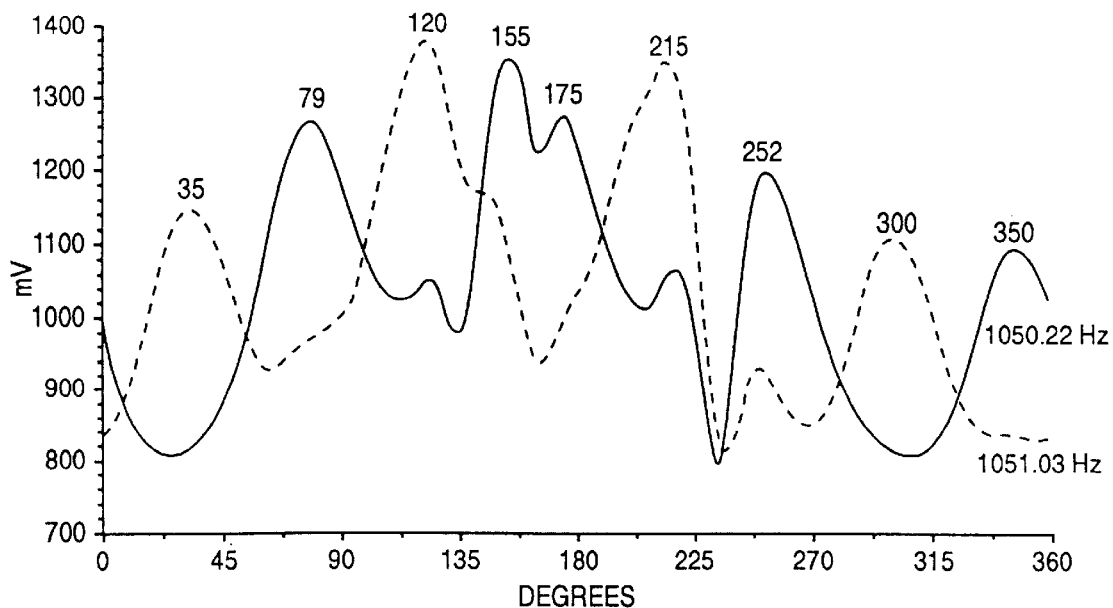
FIG. 12 is a plot of the maximum response curves of a twin mode pair of frequencies measured around the circumference of a circular brake rotor.

A further understanding of the improved method can be gained from a review of FIG. 12 which shows a plot of maximum rotor response of an actual brake rotor as a function of rotor position at a constant energy input from the power amplifier 60. It can be seen that two separate resonant response curves exist at slightly different resonant frequencies of 1050.22 Hz and 1051.03 Hz. These values represent the resonant frequencies of the respective twin mode pairs in a sample test brake rotor. The values identified adjacent each of the plotted curve peaks represent the rotational or circumferential position, in degrees, of local maximum values on each curve. These maximum values alternate between each plotted curve.

The ordinate of the graph of FIG. 12 is scaled in millivolts and represents the output measured from microphone 54. This output is measured at a constant exciter energy input provided to coil 46 from power amplifier 60. What is significant about this plot is the general alignment of the node of one of the vibrational modes with the antinode of the other "twin" mode. Each response curve is approximately sinusoidal, but includes non-sinusoidal portions created by discontinuities in the test part.

Figure 13:
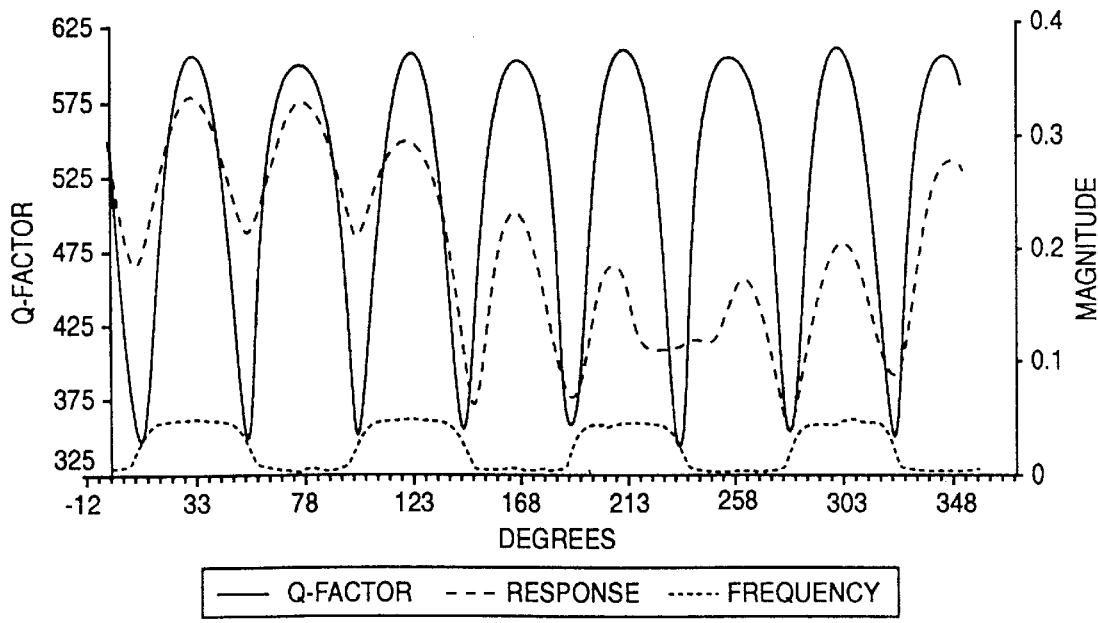
FIG. 13 is a plot of three superimposed plots related to and derived from the plot of FIG. 12, including a lower or bottom frequency plot, an intermediate response plot and an upper Q-factor plot.

Since the most accurate data for the purposes of the Q-factor determination is located at vibrational antinodes, i.e., locations on a test part where vibrational interaction between twin modes is minimized and the presence of modulated decay curves is minimized, it is desirable to locate the position of the antinodes on the part, so that accurate Q-factor values may be determined at and around these points. In order to easily locate the position of the antinodes, the plot of the resonant frequencies of the twin modes of FIG. 12 can be used, as seen in FIG. 13 where each antinode is labeled with its rotational position. Alternatively, portions of the response curves of FIG. 12 can be used to locate only one or two antinodes, which is all that is needed to practice the invention.

In FIG. 13, the lowest or bottom plot, which appears similar to a square wave plot, represents the frequencies of the twin vibrational modes of FIG. 12, i.e., 1050.22 Hz and 1051.03 Hz. These two alternating frequencies each extend periodically over a range of about 45° and are interconnected by a switchover portion or point defined by a steep transitional region extending over several degrees. This frequency plot is found by sweeping the frequency of the waveform generator 56 over an appropriate frequency range until a peak or maximum response of the type shown in FIG. 12 is obtained. The resulting response plot is plotted in FIG. 13 on the middle or intermediate curve representing the maximum response of the test brake rotor of FIG. 12.

Stated otherwise, when the maximum or dominant response portions of the two curves of FIG. 12 are plotted as a single curve on FIG. 13, i.e., the portions of the two response curves of FIG. 12 which lie above their points of intersection, the intermediate curve on FIG. 13 is produced. This response curve represents only the maximum response portions or highest amplitude portions of the two intersecting curves of FIG. 12.

What is important to note about FIG. 13 is that each response peak of the "dominant" or "maximum" response curve is located midway between the respective twin mode natural frequency portions on the lower square wave frequency plot. Moreover, the areas or portions of minimum response on this response curve are located at the steep transitional regions between twin mode frequencies.

Another way of looking at these curves is to realize that maximum response in the sample part occurs at those locations where the distance between the twin mode frequencies and their crossover or transitional regions into one another are the greatest. This occurs at the midpoint of each horizontal "step" or "block" portion of the twin pair natural frequency plot of FIG. 13. The farther a Q-factor test point is away from a transitional region into the other twin pair frequency, the less the affect the other adjacent twin pair frequency will have on that particular test point.

As it turns out, these points of minimal interaction or influence between the two natural frequencies associated with each test part occur at a vibrational antinode. Thus, one technique for locating a vibrational antinode is to identify those points on the natural frequency plot which are midway between the natural frequency switchover points. The frequency switchover points produce highly modulated decay curves, which can lead to large errors in decay slope measurement and should be avoided for Q-factor calculation purposes. Thus, by taking Q-factor measurements only around the antinodes, spurious Q-factor calculations around the frequency switchover points can be eliminated. As further seen in FIG. 13, the uppermost plot depicting the actual Q-factor plot closely corresponds to the maximum response curve of FIG. 13 and to the frequency curve of FIG. 13.

In accordance with the invention, only a small portion of a part need be tested, i.e., 90° around a part's circumference, in order to locate at least two antinodes. That is, any 90° segment of the response plot of FIG. 13 can be chosen to calculate a single Q-factor representative of the entire part. Since the response curve is periodic over 45°, an entire 360° sine wave fit can be fitted over just one or preferably two or more antinode portions of a part.

Once a first antinode is located on a part, the next antinode can be quickly located by moving around the circumference of the part by about 45° from that first antinode. Several test points should be taken over a range of locations from about 35° to 55° from the first antinode so as to be sure to find the second antinode. Additional antinode locations can be found by advancing about 45° from each antinode to begin searching for the next one and by plotting several Q-factors around both sides of the 45° advanced position.

After preferably two antinodes have been located, a sine curve of the type $C_1 sin(8\omega-\emptyset)+C_2$ is fitted to the two or more portions of the Q-factor plot to produce a sine function fit, which can be used to provide a single Q-factor value for the entire part. That is, the Q-factors are calculated only at points surrounding each of one, two or more antinodes and a sine function is fitted to only those limited portions of the Q-factor plot.

Once the Q-factor points around the selected antinodes are fit to the sine wave function, a single value is selected which is representative of the Q-factor of the entire part. Since the "cleanest" and most reproducible Q-factor values are located at and closely around the antinodes, the value of the sine wave fit function at the antinodes has been chosen to represent the overall Q-factor of the tested part.

As it turns out in practice, the Q-factor value at the antinodes can be either a maximum or minimum value of the sine wave function. Stated another way, the overall Q-factor of the sine function plot $C_1 sin(8\omega-\emptyset)+C_2$ can be represented as $C_2+C_1$, or $C_2-C_1$, depending on whether maximum or minimum values of the Q-factor plot are aligned with and occur at the antinodes. Again, these antinode locations on the tested part are those angular positions on the part which produce a maximum response at a constant input excitation level. These positions are midway from one twin pair natural frequency to the other.

In order to find the first antinode on a part, the part is mounted in a test fixture such as shown in FIG. 5 and a frequency sweep is made to find the maximum response, as in the original method. The part is then rotated 22.5° from the first test location and a similar measurement is performed. The point of greatest response of these two test points is selected, and a systematic iterative search, such as a binomial search, is made around the chosen point to locate the antinode to within a few degrees.

For example, a third test point is chosen 11.25° from the point selected from a comparison of the first two and the larger of these two points is chosen. The next test point may be selected at about 5° from the larger of the prior two test points, etc.

Once the location of an antinode is located within several degrees, i.e., ±1° to ±3°, several additional points around both sides of this location or range are measured to ensure that a range of values of $f_r$ are measured on both sides of the antinode so that the antinode is within the range of values measured. For example, if the location of an antinode is located within about ±1°, a series of measurements of $f_r$ may be taken such as at 30° increments over a range of ±9° of this ±1° range.

Once each value of $f_r$ is measured around an antinode, i.e., over the ±9° range, the slope of the decay curve is measured at each respective $f_r$ value as in the original method. The Q-factor values are calculated and plotted and result in a plot similar to that of FIG. 10 where the Q-factors are plotted around three antinodes. Once a plot of Q-factors is made around one antinode, the test part is rotated about 45° and the values of $f_r$ and the respective decay curve slopes are measured at selected intervals around the 45° rotated position, such as over 3° increments over a range of ±9° around the rotated position.

Once one, but preferably two or more Q-factor plots are made around their respective antinodes, a sine function fit is made as noted above, wherein $Q=C_1 sin(8\omega-\emptyset)+C_2$. Once this curve fit is made, the value of the curve at the antinodes is used to characterize the Q-factor of the entire test part as $C_1+C_2$ or $C_1-C_2$, depending on whether a maximum curve value or a minimum curve value is located at each antinode.

Figure 14:
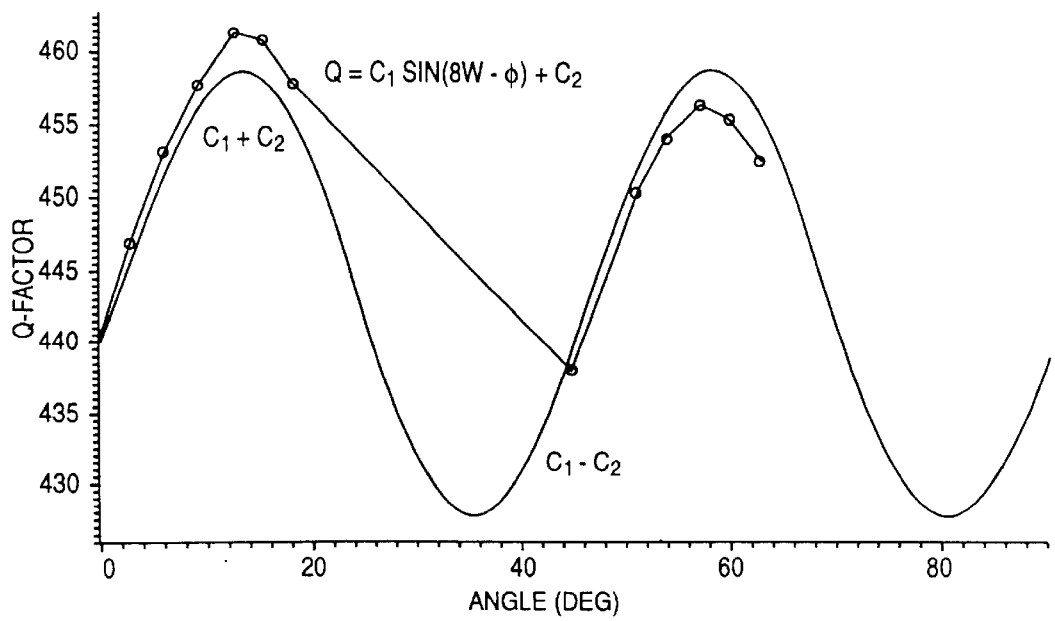
FIG. 14 is a Q-factor plot of the data taken from Table 2.

An example of a Q-factor calculation of a test part analyzed according to the improved method noted above is recorded in Table 2 set forth below and in FIG. 14 which is a plot of the Q-factor values taken from Table 2. In this example, one antinode was located at about 9° and a second antinode 45° away at about 54°. Values of Q were measured at 3° increments at ±9° around each antinode.

TABLE 2

| Position (deg) | Resonance Frequency (Hz) | Decay Duration (ms) | Decay Delta (dB) | Q-Factor |
| --- | --- | --- | --- | --- |
| 0.00 | 1056.777 Hz | 305 msec | 20.000 dB | 440.4554 |
| 3.00 | 1056.777 Hz | 309 msec | 20.000 dB | 446.8953 |
| 6.00 | 1056.777 Hz | 314 msec | 20.000 dB | 453.0269 |
| 9.00 | 1056.777 Hz | 317 msec | 20.000 dB | 457.6944 |
| 12.00 | 1056.777 Hz | 319 msec | 20.000 dB | 461.3111 |
| 15.00 | 1056.777 Hz | 319 msec | 20.000 dB | 460.5866 |
| 18.00 | 1056.777 Hz | 317 msec | 20.000 dB | 457.6430 |
| 45.00 | 1056.387 Hz | 303 msec | 20.000 dB | 437.9920 |
| 48.00 | 1056.387 Hz | 308 msec | 20.000 dB | 444.8533 |
| 51.00 | 1056.387 Hz | 312 msec | 20.000 dB | 450.5159 |
| 54.00 | 1056.387 Hz | 314 msec | 20.000 dB | 453.8612 |
| 57.00 | 1056.387 Hz | 316 msec | 20.000 dB | 456.1528 |
| 60.00 | 1056.387 Hz | 315 msec | 20.000 dB | 455.2396 |
| 63.00 | 1056.387 Hz | 313 msec | 20.000 dB | 452.5082 |

In this example, the smooth curve fit of the linear segmented plot of the Q-factor values characterizes the overall Q-factor value as 458.58. This value is equal to $C_1+C_2$ which is the maximum value of the curve $Q=C_1 sin(8w-\emptyset)+C_2$ at the antinodes. The value of $C_1-C_2$ is not used, as this minimum value of the curve is not coincident with the antinodes of the maximum or "dominant" frequency response curve discussed above.

Figure 15:
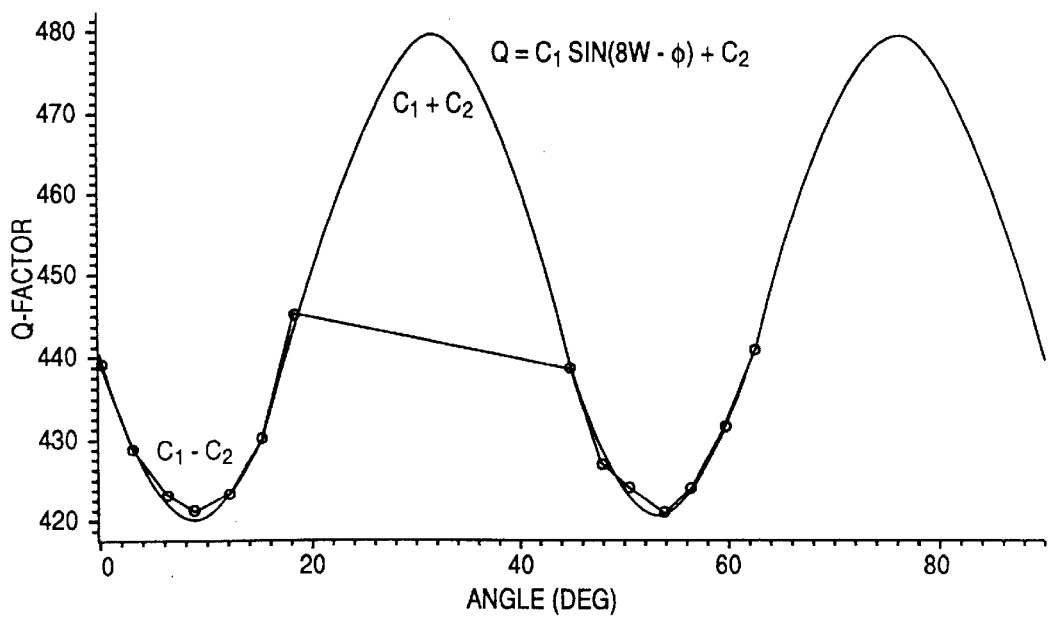
FIG. 15 is a Q-factor plot of the data taken from Table 3.

However, another test part produced the data in Table 3 and the corresponding curve of FIG. 15. In this case, the overall value of Q is characterized as 420.22 which equals $C_1-C_2$ on the corresponding since wave fit. This minimum curve value corresponds with the antinode locations on the maximum frequency response plot of the subject test part.

TABLE 3

| Position (deg) | Resonance Frequency (Hz) | Decay Duration (ms) | Decay Delta (dB) | Q-Factor |
|---|---|---|---|---|
| 0.00 | 868.831 Hz | 371 msec | 20.000 dB | 440.9164 |
| 3.00 | 868.831 Hz | 361 msec | 20.000 dB | 428.4066 |
| 6.00 | 868.831 Hz | 356 msec | 20.000 dB | 422.9019 |
| 9.00 | 868.831 Hz | 355 msec | 20.000 dB | 421.0274 |
| 12.00 | 868.831 Hz | 356 msec | 20.000 dB | 4422.9424 |
| 15.00 | 868.831 Hz | 362 msec | 20.000 dB | 429.7286 |
| 18.00 | 868.831 Hz | 375 msec | 20.000 dB | 444.9066 |
| 45.00 | 866.602 Hz | 370 msec | 20.000 dB | 438.0945 |
| 48.00 | 866.602 Hz | 360 msec | 20.000 dB | 426.4248 |
| 51.00 | 866.602 Hz | 358 msec | 20.000 dB | 423.6193 |
| 54.00 | 866.602 Hz | 355 msec | 20.000 dB | 420.4575 |
| 57.00 | 866.602 Hz | 358 msec | 20.000 dB | 423.4941 |
| 60.00 | 866.602 Hz | 364 msec | 20.000 dB | 430.9052 |
| 63.00 | 866.602 Hz | 372 msec | 20.000 dB | 440.7281 |

Many modifications and variations of the present invention are possible in light of the above teachings. Therefore, within the scope of the appended claims, the present invention may be practiced otherwise than as specifically described. For example, the invention is not limited to ferromagnetic parts. Paramagnetic parts may be tested using the setup of FIG. 5 and nonmagnetic parts may be mechanically excited to their resonant frequencies. Moreover, the invention is not limited to annular parts and may be used effectively with rectangular and asymmetrical parts. Although the invention typically measures vibration decay within a range of about 20 to 30 dB, a larger range may be used from about 5 dB to 30 dB or more.

What is claimed is:

1. A method of measuring vibration damping of a part, comprising the steps of:

(1) locating a vibrational antinode portion on said part;

(2) vibrating said part adjacent said antinode portion at a selected frequency, with a vibrator located adjacent a test portion of said part;

(3) measuring an amplitude of vibration of said part during said vibrating;

(4) deactivating said vibrator such that said amplitude decays;

(5) measuring the decay time of said amplitude over a selected range of decay;

(6) repeating each of said steps 2, 3, 4 and 5 with said vibrator respectively located adjacent each one of a series of spaced apart test portions adjacent said antinode portion of said part to obtain a series of decay times; and (7) determining a value associated with said series of test portions representative of vibration damping of said part.

2. The method of claim 1, wherein said part comprises a ferromagnetic part, wherein said vibrator comprises an exciter coil spaced apart from said part and wherein said method further comprises vibrating said part with an electromagnetic field produced by said exciter coil.

3. The method of claim 1, wherein said part comprises a brake part and wherein said method further comprises centering said brake part on a vibration isolating mounting.

4. The method of claim 1, wherein said vibrator comprises a waveform generator providing a signal to a power amplifier and wherein said step 4 comprises removing said signal to said power amplifier.

5. The method of claim 1, wherein said part is centered on a rotatable support and wherein step 6 further comprises rotating said support to respectively align each of said spaced apart positions of said part adjacent said vibrator.

6. The method of claim 1, wherein said amplitude of vibration is measured with a transducer, wherein said selected frequency produces a peak amplitude of vibration in said part and wherein said method further comprises adjusting said vibrator at said peak amplitude such that a predetermined output level is measured by said transducer prior to step 4.

7. The method of claim 1, wherein said amplitude is measured with a microphone, wherein said decay time is measured with a real time analyzer and wherein said method further comprising measuring with said microphone the sound level of said vibrating part and plotting said sound level versus time on said real time analyzer during said decay and measuring a time, td, for a predetermined decay span, ΔdB, after deactivation of said vibrator.

8. The method of claim 7, further comprising computing a value Q for each test portion of said part, wherein $$Q=(27.3)(fr)(td)/\Delta dB$$

wherein fr is a resonant frequency of said part measured in Hertz and td is measured in seconds.

9. The method of claim 8, further comprising fitting each Q value to an eighth order sine curve formula of $Q=C_1\sin(8w-\phi)+C_2$.

10. The method of claim 9, further comprising representing the value of step 7 as $C_2+C_1$ or $C_2-C_1$.

11. The method of claim 7, wherein said predetermined decay span, ΔdB, is selected from the range of 5 dB to 30 dB.

* * * * *